United States Patent
Lee et al.

(10) Patent No.: US 9,472,972 B2
(45) Date of Patent: Oct. 18, 2016

(54) WIRELESS CHARGING DEVICE AND METHOD FOR CONTROLLING THE SAME

(71) Applicant: SAMSUNG ELECTRO-MECHANICS CO., LTD., Suwon-Si, Gyeonggi-Do (KR)

(72) Inventors: Gye Won Lee, Suwon-Si (KR); Hyun Keun Lim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 199 days.

(21) Appl. No.: 14/265,968

(22) Filed: Apr. 30, 2014

(65) Prior Publication Data

US 2015/0028802 A1 Jan. 29, 2015

(30) Foreign Application Priority Data

Jul. 29, 2013 (KR) ........................ 10-2013-0089519

(51) Int. Cl.
*H02J 7/00* (2006.01)
*H02J 7/02* (2016.01)

(52) U.S. Cl.
CPC ..................................... *H02J 7/025* (2013.01)

(58) Field of Classification Search
CPC ...... H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS

| 8,432,293 | B2 * | 4/2013 | Symons | H02J 7/025 320/106 |
| 2001/0009864 | A1 * | 7/2001 | Seo | H04W 52/0261 455/574 |
| 2008/0061733 | A1 * | 3/2008 | Toya | H02J 7/025 320/103 |
| 2009/0015375 | A1 * | 1/2009 | Yang | G08B 29/185 340/7.2 |
| 2011/0062914 | A1 | 3/2011 | Park et al. | |
| 2011/0115335 | A1 * | 5/2011 | Pelletier | G06F 1/3203 310/318 |
| 2011/0221390 | A1 * | 9/2011 | Won | H02J 7/0054 320/108 |
| 2012/0075096 | A1 * | 3/2012 | Howard | G08B 13/1427 340/539.12 |
| 2012/0242158 | A1 | 9/2012 | Lee et al. | |
| 2012/0293118 | A1 * | 11/2012 | Kim | H02J 5/005 320/108 |
| 2013/0082647 | A1 * | 4/2013 | Yoon | H02J 5/005 320/108 |
| 2014/0184149 | A1 * | 7/2014 | Jung | H04B 5/0093 320/108 |

FOREIGN PATENT DOCUMENTS

| KR | 2011-0029734 A | 3/2011 |
| KR | 2012-0108190 A | 10/2012 |

\* cited by examiner

*Primary Examiner* — Arun Williams
(74) *Attorney, Agent, or Firm* — NSIP Law

(57) ABSTRACT

A wireless charging device may include: a sensor unit sensing an input from an external device and generating a wake-up signal; a control unit, upon receiving the wake-up signal, exiting from a sleep mode to enter an active mode, and generating an activation signal; a detection unit receiving the activation signal from the control unit to detect a mobile terminal; and a power supply unit, in the case that the detection unit detects the mobile terminal, supplying power to the mobile terminal wirelessly.

13 Claims, 5 Drawing Sheets

WIRELESS CHARGING DEVICE AND METHOD FOR CONTROLLING THE SAME

CROSS-REFERENCE TO RELATED APPLICATION

This application claims the benefit of Korean Patent Application No. 10-2013-0089519 filed on Jul. 29, 2013, with the Korean Intellectual Property Office, the disclosure of which is incorporated herein by reference.

BACKGROUND

The present disclosure relates to a wireless charging device and a method for controlling the same.

As information and communications technology has rapidly evolved, we live in the era of a ubiquitous communications environment in which we can communicate with everybody everywhere at all times, and thus much more information can be exchanged. It can be said that communications environments are progressing from limited environments with wired communications toward unlimited communications environments with wireless communications, unrestricted by constraints of time and space.

One of the most important issues in such unlimited communications environments is wireless charging techniques for wireless terminals. So far, wireless terminals have been charged using cords or the like. In the late $21^{st}$ century, research into wirelessly or contactlessly chargeable devices or technology therefor has begun in earnest.

In particular, smartphones and tablet PCs are widely used nowadays, and thus, demands for charging wireless terminals using cords or the like cannot keep up with rapidly changing environments. Therefore, wireless charging is attracting attention as a solution.

In wireless charging, a transmitting device determines whether a receiving device exists, and then if it is determined that a receiving device exists and needs to be charged, wireless charging is initiated. In order for the transmitting device to determine whether a receiving device exists, it is necessary to periodically apply a current to a detection coil. That is, since the transmitting device has to apply a current periodically to determine whether a receiving device exists, standby power consumed by the transmitting device significantly lowers overall system efficiency.

Patent Document 1 below relates to a wireless power transmitter and a wireless power transceiver and discloses transmitting power wirelessly according to impedance on the output side. However, the document discloses neither reducing standby power consumed by the transmitter nor using a sensor to reduce standby power, as taught by the present disclosure.

RELATED ART DOCUMENT (Patent Document 1) Korean Patent Laid-Open Publication No. 2012-0108190

SUMMARY

An aspect of the present disclosure may provide a wireless charging device and a method for controlling the same, reducing standby power usage by way of sensing an eternal input using a sensor and activating the wireless charging device when an external input is sensed.

According to an aspect of the present disclosure, a wireless charging device may include: a sensor unit sensing an input from an external device and generating a wake-up signal; a control unit, upon receiving the wake-up signal, exiting from a sleep mode to enter an active mode, and generating an activation signal; a detection unit receiving the activation signal from the control unit to detect a mobile terminal; and a power supply unit, in the case that the detection unit detects the mobile terminal, supplying power to the mobile terminal wirelessly.

The detection unit may include a detection coil detecting the mobile terminal.

The detection unit may apply a reference current to the detection coil to thereby detect a change in impedance.

The detection unit may apply a current having a level higher than that of the reference current to the detection coil if no change in impedance is detected.

The power supply unit may receive alternating current voltage from an external power source to be supplied to the mobile terminal or convert it into direct current voltage to be supplied to the mobile terminal.

The sensor unit may include a piezoelectric sensor module sensing pressure applied by the mobile terminal to generate the wake-up signal, and the control unit may receive the wake-up signal so as to exit the sleep mode to enter the active mode.

The sensor unit may include a magnetic sensor module sensing magnetic force generated by the mobile terminal to generate the wake-up signal, and the control unit may receive the wake-up signal so as to exit the sleep mode to enter the active mode.

The sensor unit may include a touch sensor module sensing a touch input from the mobile terminal to generate the wake-up signal, and the control unit may receive the wake-up signal so as to exit the sleep mode to enter the active mode.

The wireless charging power may further include: a display unit displaying a current charging state of the mobile terminal thereon.

The power may be supplied to the mobile terminal in a magnetic induction manner or in a magnetic resonance manner.

According to another aspect of the present disclosure, a method for controlling a wireless charging device may include: sensing, by a sensor unit, an input from an external device to generate a wake-up signal; upon receiving the wake-up signal, by a control unit, exiting from a sleep mode to enter an active mode, and generating an activation signal; receiving, by a detection unit, the activation signal and detecting a mobile terminal; and supplying power to the mobile terminal wirelessly if the mobile terminal is detected.

The detecting of the mobile terminal may include: applying a reference current to a detection coil to detect a change in impedance; and applying a current having a level higher than that of the reference current to the detection coil if no change in impedance is detected to detect a change in impedance.

The sensing of the input from the external device to generate the wake-up signal may include: sensing, by the sensor module, pressure applied by the mobile terminal using a piezoelectric sensor module; generating the wake-up signal if the pressure applied by the mobile terminal is sensed; and providing the wake-up signal to the control unit.

The sensing of the input from the external device to generate the wake-up signal may include: sensing, by the sensor module, magnetic force generated by the mobile terminal using a magnetic sensor module; generating the wake-up signal if the magnetic force generated by the mobile terminal is sensed; and providing the wake-up signal to the control unit.

The sensing of the input from the external device to generate the wake-up signal may include: sensing, by the sensor module, a touch input from the mobile terminal using a touch sensor module; generating the wake-up signal if the touch input from the mobile terminal is sensed; and providing the wake-up signal to the control unit.

The supplying of the power to the mobile terminal wirelessly may include supplying the power to the mobile terminal in a magnetic induction manner or supplying the power to the mobile terminal in a magnetic resonance manner.

The method may further include: displaying a current charging state of the mobile terminal on a screen.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
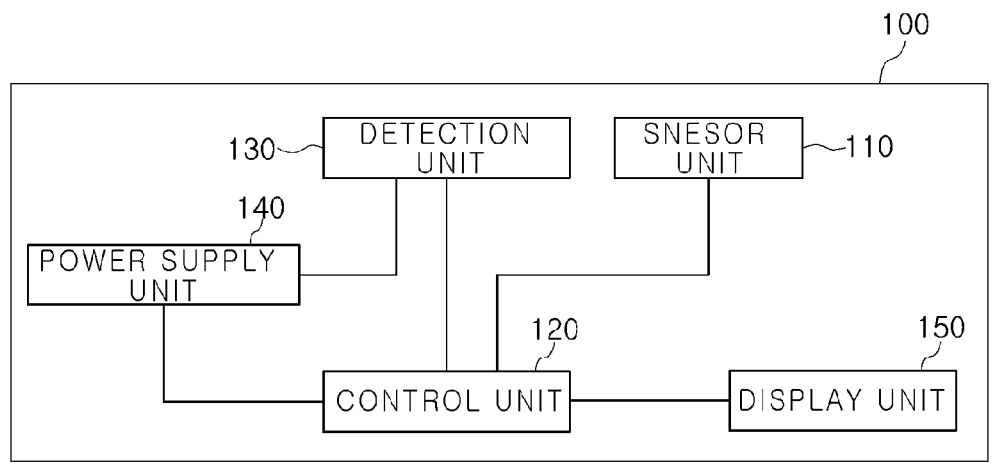
FIG. 1 is a block diagram of a wireless charging device according to an exemplary embodiment of the present disclosure.

FIG. 1 is a block diagram of a wireless charging device 100 according to an exemplary embodiment of the present disclosure.

Referring to FIG. 1, the wireless charging device 100 according to the exemplary embodiment may include may include a sensor unit 110, a control unit 120, a detection unit 130, a power supply unit 140, and a display unit 150.

The sensor unit 110 may sense an input from an external device to generate a wake-up signal. The control unit 120 may receive the wake-up signal so that it may exit a sleep mode to enter an active mode. The detection unit 130 may receive an activation signal from the control unit 120 so as to detect a mobile terminal. In addition, the power supply unit 140 may supply power to the mobile terminal 200 wirelessly when the detection unit 130 detects the mobile terminal 200.

Specifically, the wireless charging device 100 according the exemplary embodiment may be in the sleep mode until an input from the external device is detected. The input from an external device may be an input from the mobile terminal 200, for example. In the sleep mode, all of the elements other than the sensor unit 110 are in the inactive state. On the contrary, in active mode, all of the elements are normally activated.

Figure 5A:
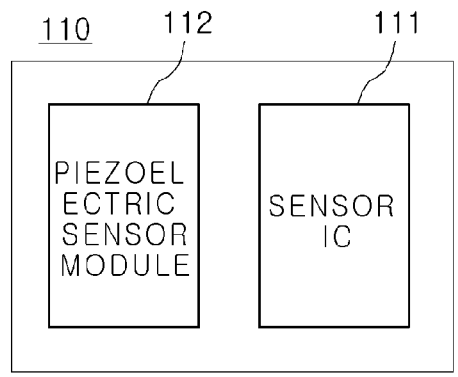
FIGS. 5A through 5C are block diagrams of a sensor unit according to an exemplary embodiment of the present disclosure.
Figure 5B:
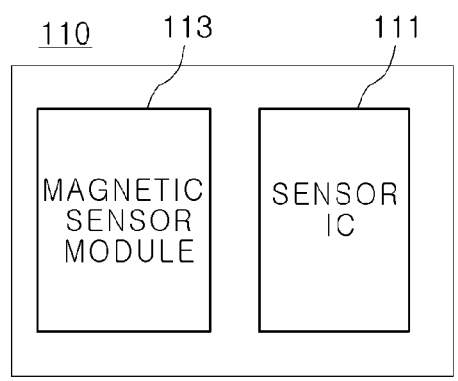
Figure 5C:
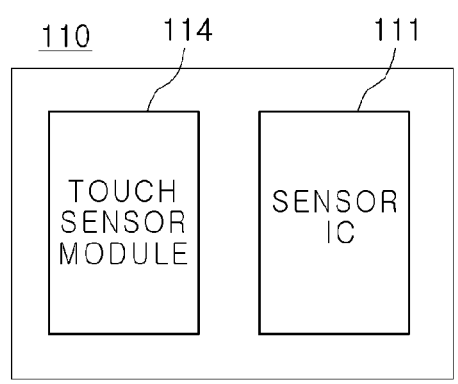

FIG. 5 is a block diagram of a sensor unit 110 according to an exemplary embodiment of the present disclosure.

The sensor unit 110 may be supplied with the minimum power for sensing an input from an external device even in the sleep mode. Referring to FIG. 5, the sensor unit 110 may include a piezoelectric sensor module 112 and a sensor IC 111. Further, the sensor unit 110 may include a magnetic sensor module 113 and a sensor IC 111 or a touch sensor module 114 and a sensor IC 111.

When the sensor module that senses an input from an external device is a piezoelectric sensor module 112, the piezoelectric sensor module 112 may sense the pressure applied when the mobile terminal 200 is placed on the wireless charging device 100. When the piezoelectric sensor module 112 senses the pressure, the sensor IC 111 may generate a wake-up signal to provide it to the control unit 120. The wake-up signal is to change the control unit 120 in the wireless charging device 100 currently in the sleep mode into the active mode.

When the sensor module that senses an input from an external device is a magnetic sensor module 113, the magnetic sensor module 113 may sense the magnetic force generated when the mobile terminal 200 is placed on the wireless charging device 100. When the magnetic sensor module 113 senses the magnetic force by the mobile terminal 200, the sensor IC 111 may generate a wake-up signal to provide it to the control unit 120.

When the sensor module that senses an input from an external device is a touch sensor module 114, the touch sensor module 114 may sense the touch input made when the mobile terminal 200 is placed on the wireless charging device 100. When the touch sensor module 114 senses the touch input from the mobile terminal 200, the sensor IC 111 may generate awake-up signal to provide it to the control unit 120.

Then, the control unit 120 may receive the wake-up signal and may exit the sleep mode to enter the active mode. At this time, the control unit 120 may exit the sleep mode to enter the active mode only if the wake-up signal is above a predetermined value.

In the foregoing descriptions, it is assumed that the external input is from the mobile terminal 200. However, the external input may be from other devices than the mobile terminal 200. In case the external input is not from the mobile terminal 200, the detection unit 130 needs to determine whether the external device that has provided the input is a mobile terminal 200 to be charged wirelessly.

Figure 2:
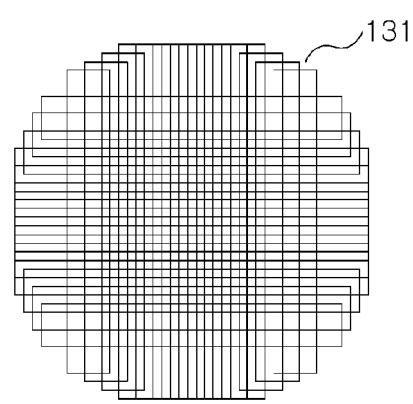
FIG. 2 is a view showing a detection coil employed by the wireless charging device according to an exemplary embodiment of the present disclosure.

FIG. 2 is a view showing a detection coil 131 employed by the wireless charging device 100 according to an exemplary embodiment of the present disclosure.

Specifically, referring to FIG. 2, the detection unit 130 may include the detection coil 131 to determine whether the mobile terminal 200 exists.

Figure 3:
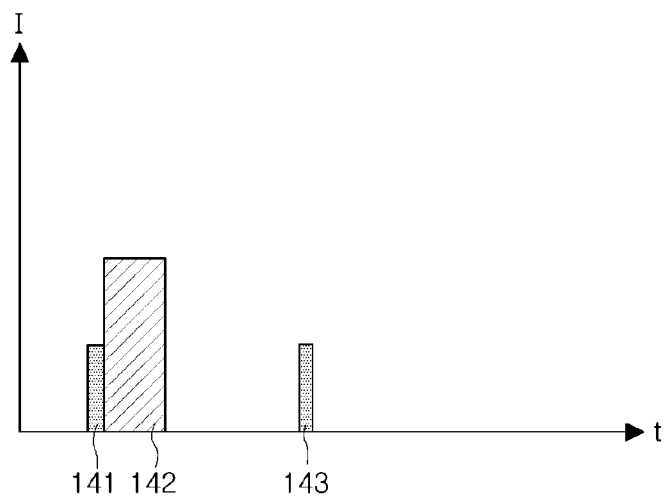
FIG. 3 is a graph showing reference currents applied to the detection coil 131 in the wireless charging device 100 according to an exemplary embodiment of the present disclosure.

More specifically, referring to FIG. 3 which is a graph showing reference currents applied to the detection coil 131 in the wireless charging device 100 according to an exemplary embodiment of the present disclosure.

The detection unit 130 may provide the reference current 141 to the detection coil 131 to detect a change in impedance. If a change in impedance is detected, the detection unit 130 determines that currently the mobile terminal 200 actually exists, and the power supply unit 140 may supply power to the mobile terminal 200 wirelessly.

On the other hand, if no change in impedance is detected, the detection unit 130 may apply a larger current to the detection coil 131. At this time, the larger current 142 may be larger than the reference current 141. If a change in impedance is detected by applying the larger current 142, the power may be supplied to the mobile terminal 200 in the same manner as described above.

Then, when the wireless charging device 100 is in the active mode, currents are applied to the detection coil 131 periodically, as represented by the second reference current 143 in FIG. 3, thereby determining whether the mobile terminal 200 exists.

The power supply unit 140 may receive alternating current power from an external power source to be supplied to the mobile terminal 200 or may convert it into direct current power to be supplied to the mobile terminal 200.

Figure 4:
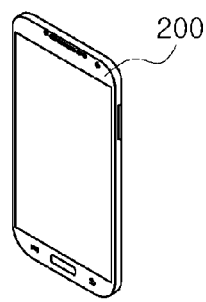
FIG. 4 is a view showing a wireless charging device according to an exemplary embodiment of the present disclosure and a mobile terminal.
Figure 4:
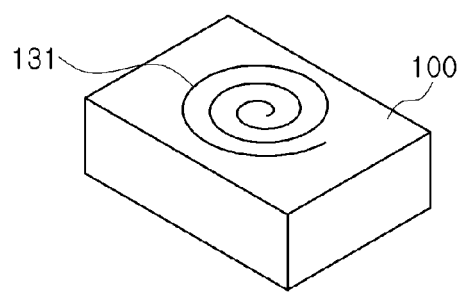

FIG. 4 is a view showing a wireless charging device 100 according to an exemplary embodiment of the present disclosure and a mobile terminal 200.

FIG. 4 is a view before the mobile terminal 200 is charged by the wireless charging device 100. When the mobile terminal 200 applies a pressure against the wireless charging device 100 or applies magnetic force or a touch input, the wireless charging device 100 currently in the sleep mode exits from the sleep mode to enter the active mode, to apply a reference current to the detection coil 131. Then, if a change in impedance is detected, power is supplied to the mobile terminal 200 wirelessly so that it is charged wirelessly.

Referring back to FIG. 1, when the mobile terminal 200 is currently being charged wirelessly, the wireless charging device 100 may display a current charging state on the display unit 150. This provides an advantage that a user may determine whether to continue charging based on the current charging state displayed on the display unit 150.

Basically, the power supply unit 140 may supply power until the mobile terminal 200 is fully charged in a magnetic induction manner or magnetic resonance manner.

Figure 6:
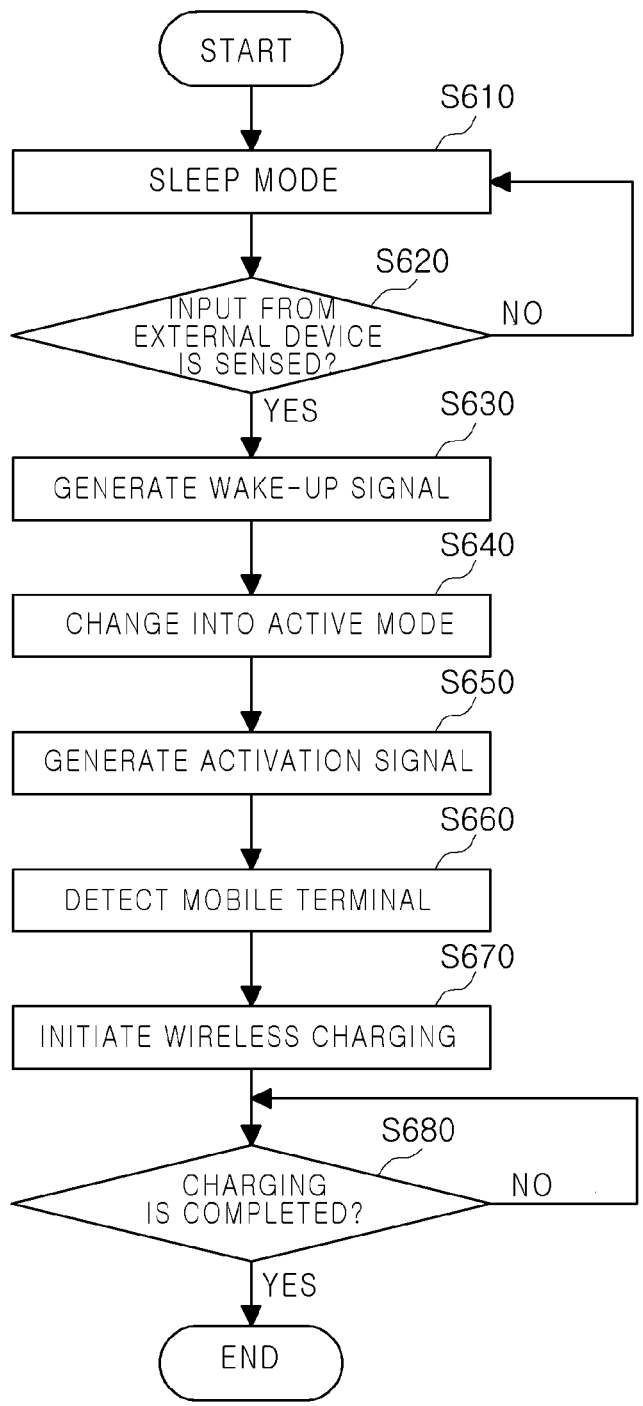
FIG. 6 is a flowchart for illustrating a method for controlling a wireless charging device according to an exemplary embodiment of the present disclosure.

FIG. 6 is a flowchart for illustrating a method for controlling a wireless charging device according to an exemplary embodiment of the present disclosure.

Figure 7:
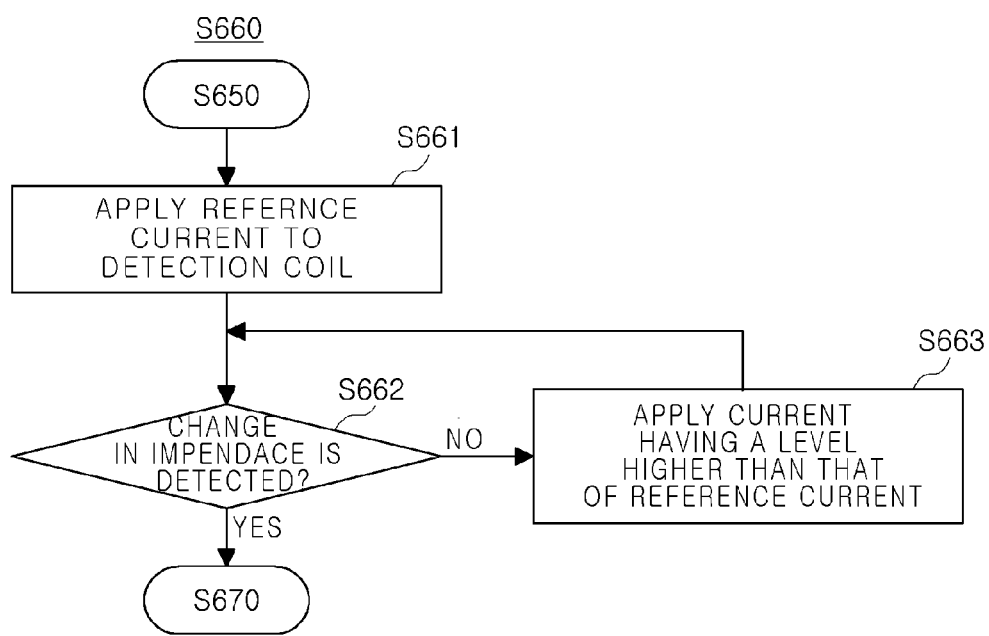
FIG. 7 is a flowchart for illustrating detecting of the mobile terminal in the method for controlling a wireless charging device illustrated in FIG. 6.

FIG. 7 is a flowchart for illustrating the detecting a mobile terminal 200 in the method for controlling a wireless charging device illustrated in FIG. 6.

The method for controlling a wireless charging device according to an exemplary embodiment of the present disclosure may include waiting, by a wireless charging device 100, in a sleep mode (S610), sensing, by a sensor unit 110, an input from an external device (S620), generating a wake-up signal in response to the input from the external device (S630), receiving the wake-up signal to change from the sleep mode into an active mode (S640), generating an activation signal (S650), determining whether a mobile terminal is detected (S660), initiating wireless charging (S670), and checking periodically until the mobile terminal is fully charged (S680).

The detecting the mobile terminal 200 in the method for controlling a wireless charging device 100 will be described in more detail with respect to FIG. 7.

A reference current may be applied to a detection coil 131 (S661). Then, it may be checked periodically whether a change in impedance is detected (S662). If a change in impedance is detected, the algorithm is terminated and power is supplied to the mobile terminal 200 wirelessly as described above with respect to FIG. 6 (S650).

In the method for controlling a wireless charging device according to an exemplary embodiment of the present disclosure, power is supplied to the mobile terminal 200 in a magnetic induction manner or a magnetic resonance manner. The method for controlling a wireless charging device according to an exemplary embodiment of the present disclosure may further include displaying a charging state of the mobile terminal 200 on a screen.

In this manner, the sensor unit 110 in the wireless charging device 100 may generate a wake-up signal based on an input from an external device, and the control unit 120 in the sleep mode is changed into the active mode, thereby reducing standby power consumed before wireless charging.

As set forth above, according to exemplary embodiments of the present disclosure, standby power of a wireless charging device can be reduced by way of sensing an eternal input using a sensor and activating the wireless charging device when an external input is sensed. By doing so, the overall power consumption can be saved.

While exemplary embodiments have been shown and described above, it will be apparent to those skilled in the art that modifications and variations could be made without departing from the spirit and scope of the present disclosure as defined by the appended claims.

What is claimed is:

1. A wireless charging device, comprising:
   a sensor unit configured to sense an input from an external device and generating a wake-up signal;
   a control unit, in response to receiving the wake-up signal, configured to exit from a sleep mode to enter an active mode, and configured to generate an activation signal;
   a detection unit configured to receive the activation signal from the control unit to detect a mobile terminal; and
   a power supply unit, in response to the detection unit detecting the mobile terminal, configured to wirelessly supply power to the mobile terminal,
   wherein the detection unit comprises a detection coil configured to detect the mobile terminal, the detection unit is configured to apply a reference current to the detection coil to thereby detect a change in impedance, and the detection unit is configured to apply a current having a level higher than that of the reference current to the detection coil in response to no change in impedance being detected.

2. The wireless charging device of claim 1, wherein the power supply unit is configured to receive alternating current voltage from an external power source to be supplied to the mobile terminal or is configured to convert the alternating current into direct current voltage to be supplied to the mobile terminal.

3. The wireless charging device of claim 1, wherein:
   the sensor unit comprises a piezoelectric sensor module configured to sense pressure applied by the mobile terminal to generate the wake-up signal; and
   the control unit is configured to receive the wake-up signal so as to exit the sleep mode to enter the active mode.

4. The wireless charging device of claim 1, wherein:
   the sensor unit comprises a magnetic sensor module configured to sense magnetic force generated by the mobile terminal to generate the wake-up signal; and
   the control unit is configured to receive the wake-up signal so as to exit the sleep mode to enter the active mode.

5. The wireless charging device of claim 1, wherein:
the sensor unit comprises a touch sensor module configured to sense a touch input from the mobile terminal to generate the wake-up signal; and
the control unit is configured to receive the wake-up signal so as to exit the sleep mode to enter the active mode.

6. The wireless charging power of claim 1, further comprising a display unit configured to display a current charging state of the mobile terminal thereon.

7. The wireless charging power of claim 1, wherein the power is supplied to the mobile terminal in a magnetic induction manner or in a magnetic resonance manner.

8. A method for controlling a wireless charging device, comprising:
sensing, by a sensor unit, an input from an external device to generate a wake-up signal;
in response to receiving the wake-up signal, by a control unit, exiting from a sleep mode to enter an active mode, and generating an activation signal;
receiving, by a detection unit, the activation signal and detecting a mobile terminal; and
wirelessly supplying power to the mobile terminal in response to the mobile terminal being detected,
wherein the detecting of the mobile terminal comprises:
applying a reference current to a detection coil to detect a change in impedance; and
applying a current having a level higher than that of the reference current to the detection coil in response to no change in impedance being detected, to detect a change in impedance.

9. The method of claim 8, wherein the sensing of the input from the external device to generate the wake-up signal comprises:
sensing, by the sensor module, pressure applied by the mobile terminal using a piezoelectric sensor module;
generating the wake-up signal in response to the pressure applied by the mobile terminal being sensed; and
providing the wake-up signal to the control unit.

10. The method of claim 8, wherein the sensing of the input from the external device to generate the wake-up signal comprises:
sensing, by the sensor module, magnetic force generated by the mobile terminal using a magnetic sensor module;
generating the wake-up signal in response to the magnetic force generated by the mobile terminal being sensed; and
providing the wake-up signal to the control unit.

11. The method of claim 8, wherein the sensing of the input from the external device to generate the wake-up signal comprises:
sensing, by the sensor module, a touch input from the mobile terminal using a touch sensor module;
generating the wake-up signal in response to the touch input from the mobile terminal being sensed; and
providing the wake-up signal to the control unit.

12. The method of claim 8, wherein the supplying of the power to the mobile terminal wirelessly comprises supplying the power to the mobile terminal in a magnetic induction manner or supplying the power to the mobile terminal in a magnetic resonance manner.

13. The method of claim 8, further comprising displaying a current charging state of the mobile terminal on a screen.

\* \* \* \* \*